Oct. 9, 1956 E. NADRO, JR 2,766,186
CONVERSION OF FLUID HYDROCARBON IN THE PRESENCE
OF A MOVING MASS OF GRANULAR CATALYST
Filed Oct. 7, 1952 3 Sheets-Sheet 2
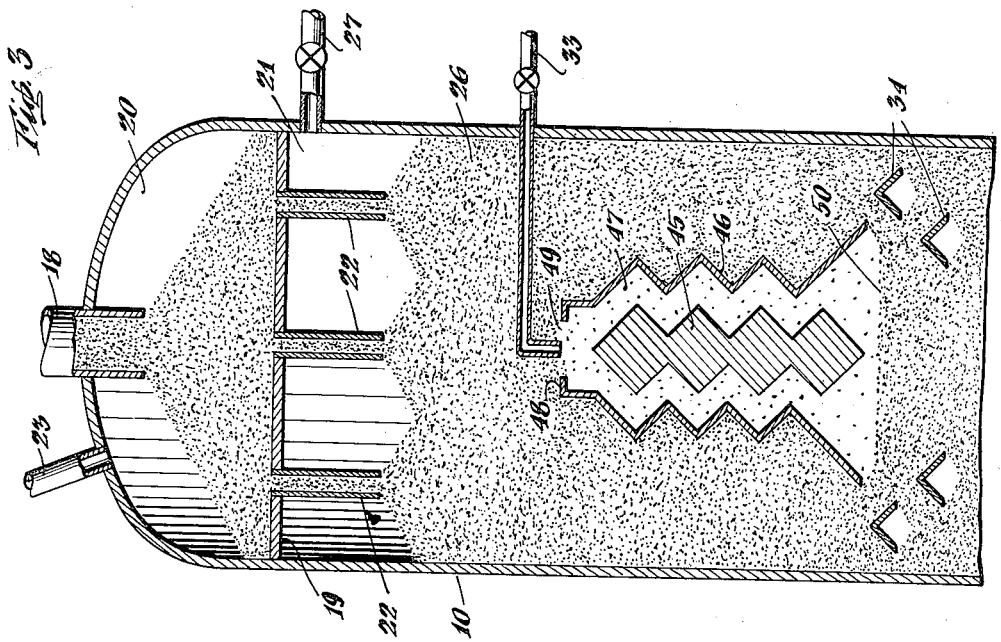
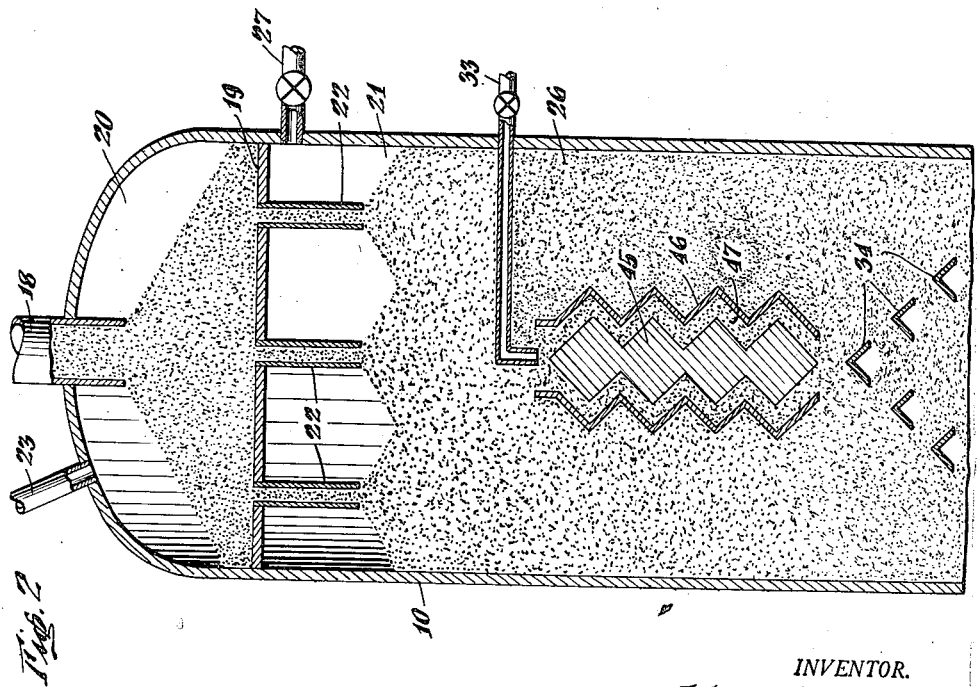
INVENTOR.
*Edward Nadro, Jr.*
BY
*Andrew L. Jabonault*
AGENT

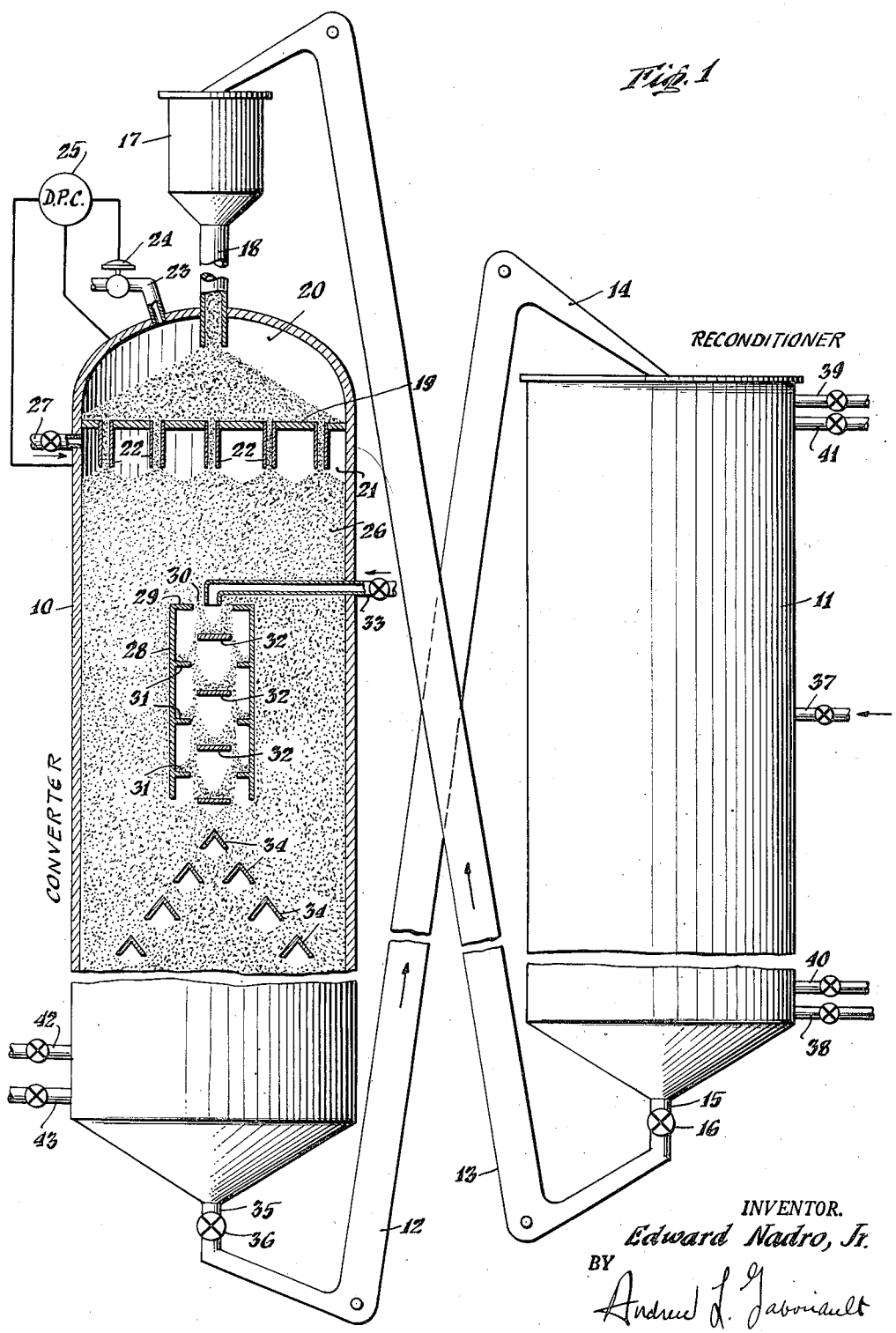

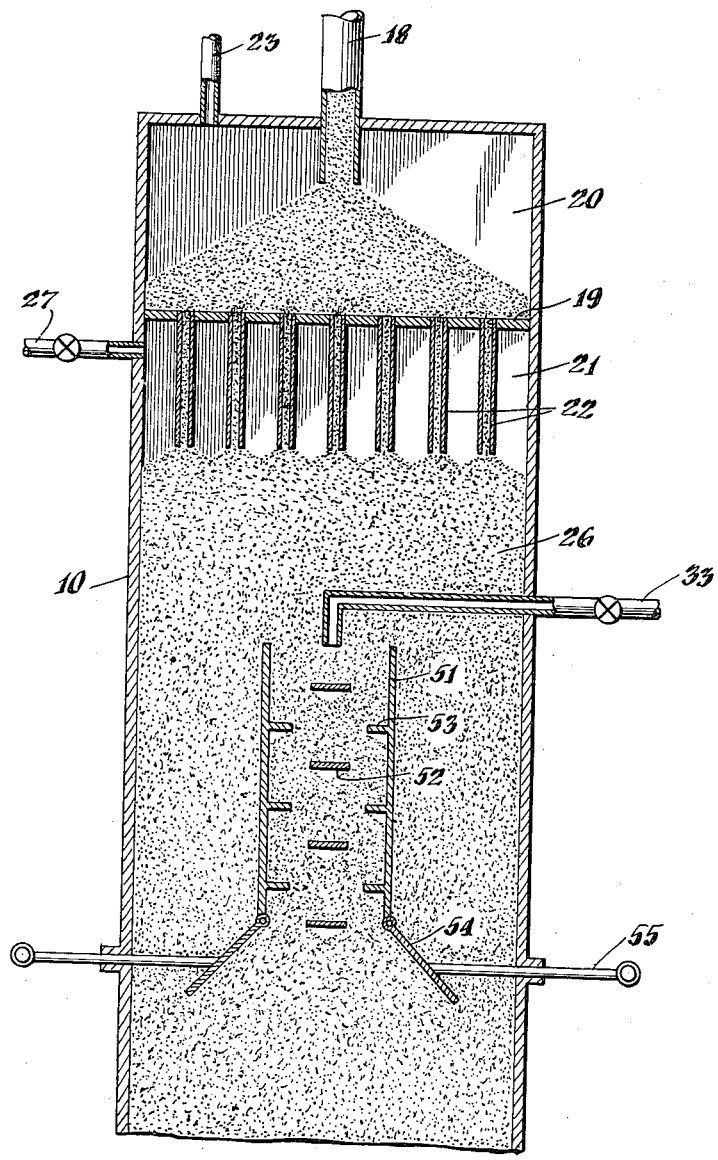

United States Patent Office 2,766,186
Patented Oct. 9, 1956

2,766,186

CONVERSION OF FLUID HYDROCARBON IN THE PRESENCE OF A MOVING MASS OF GRANULAR CATALYST

Edward Nadro, Jr., Pitman, N. J., assignor to Socony Mobil Oil Company, Inc., a corporation of New York Application October 7, 1952, Serial No. 313,431

10 Claims. (Cl. 196—52)

This invention has to do with a method and apparatus for the conversion of fluid hydrocarbons in the presence of a moving mass of granular contact material which exhibits a catalytic effect with respect to the conversion reaction. It is particularly concerned with avoiding excessive coke formation and over-conversion of the hydrocarbon charge in catalytic conversion systems wherein the hydrocarbon feed is supplied partially as a vapor and partially as a liquid.

Typical of the conversion systems to which this invention may be applied is the catalytic conversion of high boiling fluid hydrocarbons to lower boiling gaseous gasoline-containing hydrocarbons by contacting the high boiling charge with a granular adsorbent catalytic solid at temperatures of the order of 850° F. and upwards. Other exemplary processes include the catalytic reforming, desulfurization, isomerization, aromatization, and the like, of a hydrocarbon charge.

This invention has specifically to do with such conversion processes wherein the catalyst is passed cyclically through a conversion zone, wherein it flows as a substantially compact stream while being contacted by the hydrocarbon charge to effect the desired conversion thereof, and through a regeneration or reconditioning zone wherein the catalyst is contacted with a suitable combustion supporting gas to condition it for reuse in the conversion zone.

Suitable catalysts include natural or treated clays, bauxite, activated alumina or synthetic associations of silica, alumina or silica and alumina, to which certain metallic oxides or sulfides have been added for specfic purposes. The catalyst should be of palpable particulate form as distinguished from finely divided powders, and may take the shape of pellets, tablets, spheres, capsules or particles of irregular shape such as are obtained from grinding and screening operations. Generally, the catalyst should be within the size range about 3 to 100 mesh and preferably about 4 to 20 mesh by Tyler standard screen analysis. The term "granular" as used herein in describing and claiming this invention should be understood to include any contact material of the above forms and size whether of regular or irregular shape.

In systems of the aforementioned type, liquid and vapor hydrocarbon charge are normally passed through a downwardly gravitating, substantially compact bed of granular catalyst within a conversion zone. Usually the catalyst supplies at least a substantial portion of the heat required by the endothermic conversion reaction so that it must be supplied to the upper surface of the bed at high temperatures of the order of 1000–1200° F. The liquid portion of the charge is usually supplied to the upper surface of the bed with this hot catalyst. The liquid charge is normally the least refractory, that is, the most easily converted, portion of the charge so that on contacting this hot catalyst, an excessive conversion of the liquid at an undesirably high reaction temperature may occur which results in excessive deposition of coke or carbonaceous contaminants on the catalyst, excessive gas make, and a reduction in the yield of gasoline, or other desired products. Further, in most of the prior art systems, liquid charge is supplied to a plenum space above the catalyst bed. This frequently leads to atomized liquid or droplets of liquid contacting hot metal parts in the plenum space. The liquid charge striking these metal parts is converted and deposits coke thereon. These coke deposits build up over the course of time and break off as large pieces of coke which plug up restricted passages in the lower section of the conversion vessel and elsewhere in the cyclic system.

A major object of this invention is the provision of a method and apparatus for the conversion of fluid hydrocarbons which overcomes the above-described difficulties.

Another object of this invention is to provide a method and apparatus for the conversion of liquid and vaporized hydrocarbon charge together in the presence of a moving mass of granular catalyst which avoids excessive overconversion of the liquid charge.

A further object of this invention is to provide a method and apparatus for the conversion of a liquid hydrocarbon charge in the presence of a downwardly gravitating substantially compact column of granular catalyst which avoids the accumulation of coke on hot metal parts of the conversion zone housing.

These and other objects of the invention will become apparent from the following discussion of the invention.

Before proceeding with this discussion, certain terms used in describing and claiming this invention will be defined. The term "gaseous" is used herein to refer to a material in the gaseous phase under the particular operating conditions of temperature and pressure involved, regardless of what may be the normal phase of the material under ordinary atmospheric conditions. Similarly, the term "liquid" refers to a material in the liquid phase under the existing conditions, regardless of its normal state.

This invention discloses a method and apparatus for the conversion of a fluid hydrocarbon charge containing both vaporizable and non-vaporizable constituents wherein a granular catalyst is passed downwardly through a confined conversion zone as a compact mass. Fresh catalyst, at a temperature suitable to supply a substantial portion of the heat required for effecting the conversion is supplied to the upper section of the mass and spent catalyst, bearing a carbonaceous contaminant, is removed from the lower section thereof. The vaporizable constituents of the charge are supplied to the upper section of the mass as a vaporized charge and passed downwardly therethrough to effect conversion thereof. The non-vaporizable constituents of the charge are supplied as a liquid to a laterally confined catalyst-liquid mixing zone located within the catalyst mass at a level substantially below the upper surface of the mass. A portion of the catalyst from the section of the catalyst mass above the mixing zone is supplied to the upper end of the mixing zone. This catalyst has already been partially spent and cooled by the vapor charge. Catalyst and liquid charge are mixed in the mixing zone and the mixture returned to the portion of the mass which has passed around the mixing zone. The liquid and vaporized charges then pass downwardly through the remainder of the compact mass to complete the conversion thereof. Products of conversion are withdrawn from the conversion zone at a level below the lower end of the mixing zone.

The invention may be most easily understood by reference to the drawings attached hereto, of which Figure 1 is an elevational view, partially in section, showing the general arrangement of a cyclic hydrocarbon conversion system and the application of this invention to the converter vessel, and Figures 2, 3 and 4 are elevational views, partially in section, showing the application of various modifications of this invention to the upper section of hydrocarbon conversion vessels.

All of these drawings are diagrammatic in form and like parts in all bear like numerals.

Turning now to Figure 1, there is shown therein a converter 10 and a reconditioner 11 positioned side by side. Conveyors 12 and 13 are provided for the transfer of catalyst between these two vessels. These conveyors may be of any suitable construction adapted to the transfer of hot contact material particles without severe breakage and attrition, for example, bucket elevators. Reconditioner 11 is provided with a catalyst feed conduit 14 and catalyst drain conduit 15 with control valve 16. A catalyst feed hopper 17 is connected to the top of converter 10 by means of gravity feed leg 18. A transverse partition 19 extends across the upper end of converter 10 dividing it into a seal chamber 20 above the partition and a conversion chamber 21 therebelow. Seal chamber 20 is provided with conduit 23 through which inert seal gas, such as steam or flue gas, may be admitted. Conduit 23 is provided with a diaphragm control valve 24 which is operated by differential pressure controller 25 to maintain a gaseous pressure within seal chamber 20 slightly above that in conversion chamber 21. A plurality of conduits 22 depend downwardly from partition 19 and terminate in the upper section of conversion chamber 21. A conduit 27 at a level above the lower ends of 22 is provided for the admission of vaporized hydrocarbon feed to the upper section of the conversion chamber. Fixed within conversion chamber 21 with its upper end a substantial distance below the lower ends of conduits 22 and open lower end substantially above the lower end of chamber 21 is a substantially vertical mixing chamber or conduit 28. This chamber 28 may be of any desired horizontal cross-sectional shape and may be positioned at any point in the horizontal cross-section of chamber 21. It is preferable, however, that 28 be substantially removed from the walls of converter 10. Orifice plate 29 with orifice 30 is attached to the upper end of chamber 28 and baffles 31 are spaced along the vertical length of passageway 28 which are of the form of flat plates of the same size and shape as the horizontal cross-section of conduit 28, the central portion of each plate being removed. Baffles 32 of substantially less lateral dimensions than chamber 28 are spaced vertically along the center line of passageway 28 by suitable means (not shown) at points vertically between baffles 31. Baffles 31 and 32 should be substantially horizontal on their upper faces so that a small amount of contact material will be retained on said baffles. A liquid hydrocarbon charge conduit passes through the wall of housing 10 and terminates on its open, downwardly pointing, discharge end within the upper section of conduit 28. A series of upwardly pointing ring shaped angle baffles 34 are fixed in chamber 21 beneath passageway 28. Each of these baffles, successively, has a larger diameter than the one next vertically above it.

In operation, spent catalyst bearing a coky deposit or carbonaceous contaminant enters reconditioner 11 through conduit 14 and passes downwardly through the reconditioner as a compact column at a rate controlled by valve 16. Air or other oxygen containing gas is introduced into the central section of vessel 11 through conduit 37, a portion passing upwardly through the column and the remainder passing downwardly through the column. Flue gas is withdrawn by means of conduits 38 and 39. Heat is removed from the regenerating catalyst by means of cooling tubes (not shown) to prevent overheating of the catalyst to heat damaging levels. A suitable heat transfer fluid may be supplied to the cooling coils through conduit 40 and removed through conduit 41. Other reconditioner constructions than that shown and described hereinabove are contemplated within the scope of this invention.

Reconditioned catalyst is withdrawn from the reconditioner through conduit 15 and transported by means of conveyor 13 into hopper 17 from which it gravitates by means of gravity feed leg 18 onto the surface of an accumulation of catalyst maintained within seal zone 20. Catalyst from the seal chamber passes through passages 22 into the conversion zone within conversion chamber 21 and onto the surface of a substantially compact column or bed 26 of granular catalyst where it is contacted by the vaporized hydrocarbon charge which is admitted through conduit 27. The contact material column moves downwardly through vessel 10 at a rate controlled by valve 36. A portion of the catalyst bed which has been partially spent by contact with vaporized hydrocarbon charge and cooled thereby passes into mixing zone 28 through orifice 30 wherein it is contacted by liquid hydrocarbon charge injected into the stream of catalyst within passage 28 by means of conduit 33. The contact material particles are directed on a zigzag path so that the catalyst passes alternately radially inwardly and outwardly through zone 28 by means of baffles 31 and 32 and a uniform distribution of liquid hydrocarbons on the said catalyst particles is obtained, said liquid charge being partially converted to lower boiling gaseous products while passing downwardly. Erosion of baffles 31 and 32 is prevented by maintaining a stagnant layer of catalyst on the upper surface of said baffles. The mixture of catalyst and liquid charge is discharged from the lower end of the mixing zone and mixed or recombined with the catalyst which passed around the mixing zone. Baffles 34 aid in this remixing. Partially converted liquid and vaporized charges pass downwardly together through the remainder of the column below conduit 28 to complete their conversion to lower boiling gaseous products which are disengaged in the lower section of vessel 10 and removed through a conduit 42. The gaseous products withdrawn at 42 may be disengaged from the column by any of a number of suitable arrangements such as that shown by Simpson et al., U. S. Patent No. 2,336,041, or by Fahnestock in U. S. Patent No. 2,362,621. The outflowing spent catalyst is stripped free of any remaining gaseous products by means of an inert purge gas such as steam or flue gas, admitted through conduit 43. Baffles may be provided within the lower end of vessel 10 to insure uniform withdrawal of contact material from all sections of the horizontal cross-section of the conversion chamber. Such baffles are shown in Evans et al., U. S. Patent No. 2,412,136. Used contact material is withdrawn through conduit 35 and transferred by means of conveyor 12 and conduit 13 to reconditioner 11.

It is apparent that in the above described apparatus the more refractory vapor charge is contacted by freshly regenerated contact material when the temperature of said contact material is at its highest within the conversion zone while less refractory liquid charge is contacted by partially spent contact material at a lower temperature than that at which it is introduced to the conversion zone. Thus, similar products will be obtained from the conversion of both stocks, and excessive coke deposits on the contact material by the liquid charge and over-conversion of the liquid charge are avoided. Also coky deposits will not accumulate on the walls of vessel 10 since the mixing zone to which the liquid charge is supplied is removed from these walls with the catalyst bed in between so that liquid can never reach the walls. It is also possible using the apparatus of this invention to introduce a vaporized naphtha as the vapor charge rather than a vaporized gas oil. This naphtha would then be reformed in the upper section of the conversion zone while the liquid or mixed phase gas oil charge introduced through conduit 33 would be converted to lower boiling gaseous hydrocarbons in the lower section of the conversion zone.

Figure 2 illustrates an alternate form of the apparatus of this invention. The apparatus of Figure 2 is the same as that of Figure 1 with the exception that a different construction of mixing zone is used. The mixing zone here is formed by a vertical saw-tooth sided baffle 45 fixed symmetrically within a vertical saw-tooth sided conduit 46 so that a zigzag passageway or mixing zone 47 is formed between the two. The upper entrance end of passage 47 is at a level substantially below the lower ends of conduits 22 and the lower end of 47 terminates substantially above the lower end of conversion chamber 21. The lower end of passage 47 is of less cross-sectional area than its upper end.

In operation, fresh hot catalyst gravitates from seal zone 20 onto the upper surface of downwardly gravitating catalyst column or bed 26 through passages 22. Vaporized hydrocarbon charge is supplied to conversion zone 21 at a level above the upper surface of column 26 and passes into the upper end thereof. Catalyst and vapor charge pass downwardly together in the upper section of column 26. After the catalyst has been cooled and partially spent by effecting a partial conversion of the vapor charge a portion of the column passes into the upper end of passage or mixing zone 47. Since the upper end of 47 is of larger horizontal cross-section than the lower end thereof the partially spent catalyst passes therethrough as a substantially compact zigzag stream. Liquid charge is supplied to the upper section of said stream through passage 33 and flows downwardly through zone 47 and is mixed with the catalyst therein. A partial conversion of the liquid charge will occur in zone 47. The catalyst-liquid charge mixture is returned from the lower end of passage 47 to the portion of the catalyst column 26 which passed around zone 47 and remixed therewith with the aid of baffles 34. Partially converted vapor and liquid charges then pass downwardly through the lower section of column 26 below zone 47 to complete their conversion to lower boiling products. Any coke which may form on the walls of passage 47 is scrubbed off by the abrasive action of the flowing contact material flowing therethrough before any appreciable amount can build up on the walls.

A preferred form of this invention is illustrated in Figure 3. The construction shown in Figure 3 is very similar to that of Figure 2 with a vertical saw-toothed baffle 45 positioned within a vertical saw-toothed conduit 46 so as to form a zigzag passageway 47 with upper end at a level substantially below the lower ends of supply conduits 22. An orifice plate 48 with orifice 49 therethrough extends across the upper end of conduit 46. The lower end of conduit 46 is flared outwardly so that the horizontal cross-sectional area of the lower end of passageway 47 will be greater than the cross-sectional area of orifice 49.

In operation, catalyst is supplied to the upper end of compact column 26. Vaporized hydrocarbon charge is supplied to conversion zone 21 through passage 27 and passes into the upper end of column 26. A portion of the partially spent and cooled catalyst at a level substantially below the upper surface of column 26 passes into mixing zone or passage 47 through the throttling orifice 49. The catalyst falls freely down through passage 47 being impeded only by the zigzag walls of the passage. Liquid charge is injected into the falling catalyst by means of passage 33 and mixed with the catalyst during the flow through passage 47. The catalyst and liquid charge drop onto a catalyst surface 50 below passage 47 and are then recombined with the portion of the catalyst column which flows around mixing zone 47. The freely falling catalyst in 47 scrubs the walls of passage 47 free of any coke deposits before excessive coke buildup occurs. The rate of catalyst flow through bed 26 is normally controlled by controlling the rate of withdrawal, by a valve or other means, through a drain conduit at the lower end of the conversion vessel, such as valve 36 in conduit 35 in Figure 1. Thus, the rate of catalyst withdrawal from the bottom of passage or mixing zone 47 depends on the linear velocity of the downward catalyst movement in the portion of column 26 directly below the projected area of the lower end of passage 47 and the ratio of the horizontal cross-sectional area of the lower end of 47 to the horizontal cross-sectional area of the annular portion of the bed 26 surrounding the lower end of passage 47. In Figure 3 then, a greater volume of catalyst will be drawn from mixing passage 47 than will be drawn from the mixing passage of Figure 2, where the total catalyst flow through the two conversion zones is the same, because the lower end of the mixing passage in Figure 3 occupies a substantially greater portion of the horizontal cross-sectional area of vessel 10 than does the mixing passage in Figure 2. In general, the bottom of the mixing passage 47 should be of an area in proportion to the total horizontal cross-sectional area of the bed, which will give the desired catalyst flow through the mixing passage. In Figure 3 the flow of catalyst into mixing passage 47 is controlled by the size of orifice 49 so that there is a shower of freely falling catalyst in the passage. This shower may only be maintained if sufficient area is provided at the base of passage 47 to permit catalyst to be withdrawn therefrom at a rate as great or greater than the rate of flow of catalyst into the passage through orifice 49. The modification of Figure 3, therefore, may be used in conversions where high ratios of liquid feed to vapor feed are used since it provides for the larger flow of contact material through the mixing passage which is required when larger quantities of liquid feed are used.

Figure 4 illustrates another modification of this invention. The conversion vessel 10 shown therein is of rectangular cross-sectional area and a rectangular mixing passage is positioned in the conversion chamber 21 thereof at a level substantially below the lower ends of supply conduits 22. Spaced apart vertically throughout the length of chamber 51 are central baffles 52 and peripheral baffles 53, spaced at alternate levels so as to baffle the contact material flowing through 51 in a siz-zag passage. Deflector baffles 54 are pivoted on the lower edges of 51 so as to be capable of lateral movement. Rods 55 extend from baffles 54 to the exterior of vessel 10 so that baffles 54 may be adjusted from outside the vessel.

In operation, fresh hot catalyst gravitates from the accumulation thereof in seal zone 20 through passages 22 onto the upper surface of catalyst column 26 in conversion zone 21. Vapor charge is admitted above column 26 through passage 27 and passes into the upper end of column 26. At a level substantially below the upper surface of 26 a portion of the catalyst in column 26 which has been partially spent and cooled by contact with the vapor charge, passes into mixing zone 51 and is contacted by liquid charge admitted through passage 33. The catalyst flows downwardly through zone 51 as a substantially compact zig-zag stream. Deflector baffles 54 form the lower end of the mixing zone and may be adjusted to any desired position by rods 55, thereby adjusting the amount of contact material passing through passage 51 by adjusting the part of the horizontal cross-section of bed 26 which lies directly beneath the projected area of the mixing zone, the projected area in this case being the projected area of the lower ends of baffles 54. It is possible to adjust the flow through the mixing zone in this manner because there is no throttle at the upper end of 51, as in Figure 3, and the capacity of 51 is great enough to handle the entire flow of catalyst in the conversion zone. Thus, the catalyst will always flow as a compact stream through 51 at a rate determined by the position of baffles 54. Liquid charge and catalyst after being mixed in the mixing zone are combined with the catalyst and vapors which passed around the mixing zone and the conversion is completed in the lower section of column 26 as previously described.

The various parts of the apparatus of this invention may take other forms than those shown and described above. For example, the conversion vessel has been shown as circular or rectangular in shape, but it may assume any other desired shape such as hexagonal, octagonal, etc. While the mixing zone has been shown as of the same shape as the conversion vessel, it may be of any other desired shape. More than one mixing zone may be used, if desired, and the various mixing zones may be at the same level or a variety of levels below the upper surfaces of catalyst column 26.

Operating conditions will vary widely depending on the particular application of this invention. It is desirable that coke amounting to about 0.3 to 1.3 percent by weight of the catalyst and preferably about 0.4 to 1.0 percent by weight of the catalyst should be deposited on the catalyst before it is first supplied to the mixing zone and contacted with liquid feed to avoid over-conversion of the liquid feed and high coke deposition by the feed as described above. Also, for these same reasons, the catalyst should be cooled to a temperature level below 1000° F. and preferably below 950° F. before initial contact with the liquid charge. Catalyst may be supplied to the conversion zone at its upper end at a temperature within the range about 950° F. to 1150° F., while vapor charge may be supplied at a temperature within the range about 750° F. to 1050° F. The residual coke remaining on the catalyst supplied to the conversion zone should not exceed about 0.3 percent by weight of the catalyst and preferably not exceed about 0.1 percent by weight of the catalyst. Operations in the reconditioning zone should be controlled to regenerate the catalyst to the desired level of coke deposits. Generally about 10 percent to 80 percent of the total catalyst flowing through the conversion zone should be passed through the liquid feed mixing zone while the remainder flows around the mixing zone, the catalyst supplied to the upper end of the catalyst column being taken as 100 percent. The amount of catalyst passed through the mixing zone will depend to a certain extent on the ratio of liquid to vapor feed. Of the total feed charged from 5 to 75 percent may be charged as liquid but preferably the amount charged as liquid will be within the range 10 to 50 percent of the total feed. The fresh catalyst should preferably supply substantially all or a major portion of the heat required by the conversion reaction but in some cases the fresh catalyst may supply only a substantial portion of the reaction heat while the vaporized charge may supply about 10 to 40 percent of reaction heat. The liquid charge may normally be supplied at a temperature within the range about 700° F. to 850° F.

This invention should be understood to cover all changes and modifications of the examples of the invention herein chosen for purposes of disclosure which do not constitute departures from the spirit and scope of the invention.

What is claimed is:

1. A catalytic cracking process for the conversion of a fluid hydrocarbon charge in the presence of a moving mass of granular catalyst maintained within a confined conversion zone, said fluid charge containing constituents which are vaporizable and other constituents which are not vaporizable at conditions maintained within the conversion zone, which comprises: supplying fresh catalyst at a temperature suitable to supply a substantial portion of the heat required by the conversion reaction to the upper section of a downwardly moving substantially compact bed of granular catalyst within a confined conversion zone whereby the temperature of the catalyst supplied to said bed is substantially above the optimum temperature for the conversion of the non-vaporizable portion of the fluid hydrocarbon charge, supplying the vaporizable portions of said charge as a vaporized charge into the upper section of said bed and passing the vaporized charge downwardly therethrough, maintaining a confined substantially vertical mixing zone of restricted horizontal cross-section along most of its length amounting to only a minor fraction of the horizontal cross-section of said bed within said bed with upper end at a level substantially below the upper surface of said bed and passing a portion of the catalyst from said bed which has been partially spent and cooled by said vaporized charge into the upper end of said mixing zone and downwardly therethrough in a zigzag path, injecting the non-vaporizable portions of said charge as a liquid charge into the upper section of said mixing zone and passing the liquid charge downwardly therethrough with the catalyst to become mixed therewith, mixing the liquid charge and catalyst back into the portion of the catalyst which passed around said mixing zone and passing liquid and vapor charges downwardly through the portion of the bed below said mixing zone to complete the conversion to gaseous products, removing said gaseous products from the lower section of said conversion zone and removing spent catalyst from the lower section of said bed separately of the gaseous products.

2. A continuous process for the conversion of fluid hydrocarbons in the presence of a moving mass of granular catalyst, which comprises: maintaining a downwardly gravitating substantially compact column of granular catalyst within a confined conversion zone, supplying catalyst bearing less than about 0.3 percent by weight of carbonaceous contaminant and at a temperature suitable to supply a substantial portion of the heat required by the conversion reaction to the upper section of said bed, supplying a vaporized hydrocarbon charge to the upper section of said bed and passing the vaporized charge downwardly through said upper section to effect a partial conversion of said charge with resultant deposition of carbonaceous contaminants and cooling of the catalyst, maintaining a confined substantially vertical mixing zone within said bed of restricted horizontal cross-sectional area amounting to only a minor fraction of the horizontal cross-sectional area of said bed, the upper end of said mixing zone being at a level below the upper surface of said bed such that the carbonaceous contaminant deposited on the catalyst at said level due to partial conversion of the vaporized charge is within the range about 0.3 to 1.3 percent by weight of the catalyst, passing a portion of said catalyst from said bed to the upper end of said mixing zone and passing the remainder of the catalyst in said bed around the mixing zone, passing catalyst through said mixing zone in a zigzag path, injecting a liquid hydrocarbon charge into said catalyst in the upper section of said mixing zone and passing said liquid charge downwardly with the catalyst therein to become mixed with said catalyst and partially converted thereby, discharging the catalyst-liquid charge mixture from the lower end of said mixing zone and recombining said mixture with the portion of said bed which passed around the mixing zone, passing partially converted liquid and vaporized charge downwardly together through the lower section of said column below said mixing zone to complete the desired conversion to gaseous products, removing said gaseous products from the lower section of said conversion zone separately of the catalyst, removing spent catalyst from the lower section of said column and passing the spent catalyst to a confined regeneration zone, reducing the carbonaceous contaminant of the catalyst in said regeneration zone to less than about 0.3 percent by weight of the catalyst and returning the regenerated catalyst to said conversion zone to supply said column as aforementioned.

3. A continuous process for the conversion of fluid hydrocarbons in the presence of a moving mass of granular catalyst, which comprises: maintaining a downwardly gravitating substantially compact column of granular catalyst within a confined conversion zone, supplying catalyst at a temperature within the range about 950° F. to 1150° F. and bearing a carbonaceous contaminant deposit less than about 0.1 percent by weight of the catalyst to the upper section of said column, supplying a vaporized hydrocarbon charge to the upper section of said column at a temperature within the range about 750° F. to 1050° F. and passing said vaporized charge downwardly through the upper section of said column to effect a partial conversion thereof with resultant cooling of the catalyst and deposition of carbonaceous contaminants thereon, maintaining a confined substantially vertical mixing zone of restricted horizontal cross-sectional area amounting to only a minor fraction of the horizontal cross-sectional area of said column along most of its length, within said column with upper end at a level below the upper surface of said column where the carbonaceous contaminant deposited on the catalyst is within the range about 0.4 to 1.0 percent by weight of the catalyst and the catalyst temperature is less than about 950° F., passing a portion of said catalyst in said column into the upper end of said mixing zone and passing the remainder of the catalyst around said mixing zone, passing catalyst downwardly through said mixing zone in a zigzag path, injecting a liquid hydrocarbon charge at a temperature within the range 750° F. to 1050° F. into the catalyst in the upper section of said mixing zone and passing said liquid charge downwardly with the catalyst therein thereby mixing liquid charge and catalyst therein and effecting a partial conversion of the liquid charge, discharging the mixture of liquid charge and catalyst from the mixing zone and remixing said mixture with the portion of the catalyst in said bed which passed around said mixing zone, passing the partially converted liquid and vaporized charges downwardly together through the lower section of said bed below said mixing zone to complete the conversion thereof, removing gaseous products of conversion from the lower section of said column separately of the catalyst, removing spent catalyst from the lower section of said column and passing the spent catalyst to a confined regeneration zone, reducing the amount of carbonaceous contaminant deposit on the catalyst in said regeneration zone to at least about 0.1 percent by weight of the catalyst and returning said catalyst to said conversion zone to supply said bed as aforesaid.

4. A continuous process for the conversion of a fluid hydrocarbon charge containing both vaporizable and non-vaporizable constituents in the presence of a moving mass of granular catalyst which comprises: maintaining a downwardly gravitating substantially compact column of granular catalyst within a confined conversion zone, supplying fresh catalyst at a temperature suitable to supply a major portion of the heat required by the conversion reaction to the upper section of said column whereby said catalyst is supplied at a temperature substantially above the optimum temperature for the conversion of the non-vaporizable constituents of said charge, supplying the vaporizable constituents of said charge as a vaporized charge to the upper section of said column and passing said vaporized charge downwardly through the upper section of said column to effect a partial conversion thereof with resultant deposit of carbonaceous contaminant on the catalyst and cooling of the catalyst, maintaining a confined substantially vertical mixing zone within said column with upper end substantially below the upper surface of said column, passing a portion of the catalyst from said column into the upper end of said mixing zone and passing the remainder of the catalyst in said column around said mixing zone, passing catalyst downwardly through said mixing zone in a zigzag path as a freely falling shower of catalyst particles, injecting the non-vaporizable constituents of said charge as a liquid charge into said shower and passing the liquid charge downwardly with said shower whereby liquid charge and catalyst will be mixed and the liquid charge will be partially converted, dropping said mixture on a catalyst surface below said mixing zone and recombining said mixture with the catalyst passed around said mixing zone, passing partially converted liquid and vaporized charges downwardly through the lower section of said column below said mixing zone to complete the desired conversion thereof to gaseous products, removing said products from the lower section of said column separately of catalyst and removing spent catalyst from the lower section of said column.

5. A continuous process for the conversion of a fluid hydrocarbon charge containing both vaporizable and non-vaporizable constituents in the presence of a moving mass of granular catalyst which comprises: maintaining a downwardly gravitating substantially compact column of granular catalyst within a confined conversion zone, supplying fresh catalyst at a temperature suitable to supply a major portion of the heat required by the conversion reaction to the upper section of said column whereby said catalyst is supplied at a temperature substantially above the optimum temperature for the conversion of the non-vaporizable constituents of said charge, supplying the vaporizable constituents of said charge as a vaporized charge to the upper section of said column and passing said vaporized charge downwardly through the upper section of said column to effect a partial conversion thereof with resultant deposit of carbonaceous contaminant on the catalyst and cooling of the catalyst, maintaining a confined substantially vertical mixing zone within said column with upper end substantially below the upper surface of said column, passing a portion of the catalyst from said column into the upper end of said mixing zone and passing the remainder of the catalyst in said column around said mixing zone, passing catalyst downwardly through the mixing zone in a zigzag path whereby the catalyst flows alternately radially inwardly and radially outwardly, injecting the non-vaporizable constituents of said charge as a liquid charge into the upper section of said stream and passing the liquid charge downwardly with said stream to become mixed therewith and effect a partial conversion of said liquid charge, expanding the lower section of said mixing zone and thereby said stream so that the horizontal cross-sectional area of the lower end of said mixing zone is a percentage of the total horizontal cross-sectional area of the bed about equal to the percentage of non-vaporizable constituents in the total hydrocarbon feed whereby the percentage of the total catalyst flow in the conversion zone which flows through the mixing zone is about equal to the percentage of the non-vaporizable constituents in the hydrocarbon feed, discharging the catalyst-liquid mixture from said mixing zone and mixing said mixture with the portion of the column which passed around said mixing zone, passing partially converted liquid and vaporized charges downwardly through the lower section of said column below said mixing zone to complete the desired conversion to gaseous products, removing said gaseous products from the lower section of said column separately of the catalyst and removing spent catalyst from the lower section of said column.

6. An apparatus for the continuous conversion of a hydrocarbon charge containing vaporizable and non-vaporizable constituents in the presence of a moving mass of granular catalyst which comprises in combination: an enclosed substantially vertical conversion chamber adapted to contain a downwardly gravitating substantially compact column of granular catalyst, members defining at least one passageway for the supply of granular catalyst extending into the upper end of said conversion chamber and terminating in the upper section thereof, an enclosed mixing chamber of restricted horizontal cross-sectional area over most of its length amounting to only a minor fraction of the horizontal cross-sectional area of said conversion chamber positioned within said conversion chamber with upper end substantially below the lower end of said supply passageway and lower end substantially above the lower end of said conversion chamber, means for supplying catalyst from said column to the upper end of said mixing chamber, at least one baffle within said mixing chamber so positioned as to impart a zigzag path to catalyst passing therethrough, means for supplying the non-vaporizable constituents of said charge as a liquid charge to the upper section of said mixing chamber, means for removing mixed liquid charge and catalyst from the lower section of said mixing chamber back into said column, means for supplying the vaporizable constituents of said charge as a vaporized charge to the upper section of said conversion chamber at a level substantially above the upper end of said mixing chamber, means for removing gaseous products of conversion from said conversion chamber separately of catalyst at a level substantially below the lower end of said mixing chamber and means for removing spent catalyst from the lower section of said conversion chamber.

7. An apparatus for the continuous conversion of fluid hydrocarbons to gaseous products in the presence of a downwardly gravitating, substantially compact column of granular catalyst, which comprises in combination: an enclosed, substantially vertical conversion chamber adapted to confine said catalyst column, at least one conduit for the supply of catalyst at a temperature suitable to supply a substantial portion of the heat required by the conversion reaction extending into and terminating in the upper section of said conversion chamber, a vertical mixing conduit of substantially less horizontal cross-sectional area than said chamber positioned within said chamber with open upper end at a level substantially below the lower end of said supply conduit and open lower end substantially above the lower end of said chamber, a plurality of baffles with substantially horizontal upper faces adapted to maintain a small amount of catalyst on their upper surfaces vertically spaced apart along the interior of said mixing conduit and fixed alternately at the center of said mixing conduit and along the inner periphery of said mixing conduit so as to impart a zigzag path to catalyst flowing through said mixing conduit, a liquid hydrocarbon charge conduit extending into said conversion chamber and terminating on its downwardly facing discharge end within the upper section of said mixing conduit, a vaporized hydrocarbon charge conduit extending into the upper section of said conversion chamber at a level above the lower end of said catalyst supply conduit, means for removing gaseous products from the lower section of said chamber at a level substantially below the lower end of said mixing conduit and means for removing spent catalyst from the lower end of said chamber.

8. An apparatus for the conversion of fluid hydrocarbons to gaseous products in the presence of a downwardly gravitating, substantially compact column of granular catalyst which comprises in combination: an enclosed substantially vertical conversion chamber adapted to confine said catalyst column, at least one conduit for the supply of catalyst at a temperature suitable to supply a substantial portion of the heat required by the conversion reaction extending into the upper end of said chamber and terminating in the upper section thereof, a substantially vertical saw-tooth sided conduit of substantially less horizontal cross-sectional area than the horizontal cross-sectional area of said chamber and positioned within said chamber with open upper end substantially below the lower end of said supply conduit and open lower end substantially above the lower end of said chamber, a saw-tooth sided baffle positioned symmetrically within said saw-tooth sided conduit so as to provide a zigzag passageway for contact material flow between baffle and conduit, a liquid hydrocarbon change conduit extending into said conversion chamber and terminating on its open discharge end within the upper section of said saw-tooth sided conduit, a vaporized hydrocarbon charge conduit extending into the upper section of said chamber at a level above the lower end of said catalyst supply conduit, means for withdrawing gaseous products of conversion from the lower section of said chamber at a level substantially below the lower end of said saw-tooth sided conduit and means for removing spent catalyst from the lower end of said chamber.

9. An apparatus for the continuous conversion of fluid hydrocarbons to gaseous products in the presence of a downwardly gravitating, substantially compact column of granular catalyst which comprises in combination: an enclosed substantially vertical conversion chamber adapted to confine said column of catalyst, at least one supply conduit for catalyst extending into the upper end of said chamber and terminating within the upper section of said chamber, a substantially vertical mixing conduit fixed within said conversion chamber with upper end substantially below the lower end of said supply conduit and open lower end substantially above the lower end of said chamber, said last-named mixing conduit being of horizontal cross-sectional area substantially less than the horizontal cross-sectional area of said chamber over most of its length and flaring outwardly in its lower section, an orifice plate with orifice therethrough across the upper end of said mixing conduit, said orifice being of less horizontal cross-sectional area than the lower end of said mixing conduit, baffle within said mixing conduit adapted to direct catalyst flowing through said conduit along a zigzag path, a liquid hydrocarbon charge conduit terminating on its open discharge end in the upper section of said mixing conduit, a vaporized hydrocarbon charge conduit extending into the upper section of said chamber at a level substantially above the upper end of said mixing conduit, means for removing gaseous products from the lower section of said chamber at a level substantially below the lower end of said mixing conduit, and means for removing catalyst from the lower end of said chamber.

10. An apparatus for the continuous conversion of fluid hydrocarbons in the presence of a downwardly gravitating, substantially compact column of granular catalyst, which comprises in combination: an enclosed elongated substantially vertical conversion chamber, at least one conduit for the supply of catalyst at a temperature suitable to supply a major portion of the heat required by the conversion reaction extending into the upper end of said conversion chamber and terminating in the upper section of said chamber, a rectangular mixing conduit of substantially less horizontal cross-sectional area than the horizontal cross-sectional area of said chamber positioned within said chamber with open upper end substantially below the lower end of said supply conduit and with open lower end substantially above the lower end of said chamber, at least one baffle within said mixing conduit adapted to impart a zigzag path of flow to catalyst flowing through said mixing conduit, a liquid hydrocarbon charge conduit extending into said chamber and terminating on its open discharge end within the upper section of said mixing conduit, deflector baffles with upper ends pivoted on the edges of the lower end of said mixing conduits so as to be capable of lateral movement, means for moving and positioning said deflector baffles from the exterior of said chamber, a vaporized hydrocarbon charge conduit extending into said chamber and terminating therein at a level substantially above the upper end of said mixing conduit, means for removing gaseous products from said chamber at a level substantially below the lower end of said mixing conduit and a conduit for the withdrawal of catalyst from the lower end of said chamber.

References Cited in the file of this patent

UNITED STATES PATENTS

| Number | Name | Date |
| --- | --- | --- |
| 2,439,730 | Happel | Apr. 13, 1948 |
| 2,458,357 | Evans | Jan. 4, 1949 |
| 2,492,998 | Lassiat | Jan. 3, 1950 |
| 2,565,811 | Hall | Aug. 28, 1951 |
| 2,587,670 | Weinrich | Mar. 4, 1952 |
| 2,683,109 | Norris | July 6, 1954 |